United States Patent
Park et al.

(10) Patent No.: US 8,836,235 B2
(45) Date of Patent: Sep. 16, 2014

(54) APPARATUS FOR AUTOMATICALLY CONTROLLING THE ILLUMINATION OF LED LIGHTING

(75) Inventors: Chung Ha Park, Yongin-si (KR); Jung Chul Wee, Yongin-si (KR); Jae Heon Kim, Seoul (KR)

(73) Assignee: Planet System Co., Ltd., Jungwon-gu, Seongnam-si, Gyeonggi-do (KR)

( * ) Notice: Subject to any disclaimer, the term of this patent is extended or adjusted under 35 U.S.C. 154(b) by 0 days.

(21) Appl. No.: 13/805,851

(22) PCT Filed: Jun. 24, 2011

(86) PCT No.: PCT/KR2011/004623
§ 371 (c)(1),
(2), (4) Date: Dec. 20, 2012

(87) PCT Pub. No.: WO2011/162569
PCT Pub. Date: Dec. 29, 2011

(65) Prior Publication Data
US 2013/0093353 A1 Apr. 18, 2013

(30) Foreign Application Priority Data
Jun. 25, 2010 (KR) .................. 10-2010-0060535

(51) Int. Cl.
*G05F 1/00* (2006.01)
*H05B 33/08* (2006.01)
*H05B 37/02* (2006.01)

(52) U.S. Cl.
CPC ............ *H05B 37/02* (2013.01); *H05B 33/0848* (2013.01); *Y02B 20/346* (2013.01); *H05B 33/0815* (2013.01)
USPC ........... 315/291; 315/224; 315/307; 315/360; 315/246; 345/96; 345/207

(58) Field of Classification Search
USPC ............. 315/291, 294, 219, 224, 307, 169.3, 315/295, 209 R, 158; 345/96, 207; 340/540; 348/135
See application file for complete search history.

(56) References Cited

U.S. PATENT DOCUMENTS 7,928,663 B1 * 4/2011 Kumar .......................... 315/246
8,222,832 B2 * 7/2012 Zheng et al. .................. 315/291
(Continued)

FOREIGN PATENT DOCUMENTS

KR 10-2006-0086447 A 7/2006
KR 10-2009-0062092 A 6/2009
(Continued)

OTHER PUBLICATIONS

KR 2003080415 A, Yoo B G, Apparatus and method for controlling illuminance of lamp, Oct. 17, 2003.*
(Continued)

Primary Examiner — Douglas W Owens
Assistant Examiner — Syed M Kaiser
(74) Attorney, Agent, or Firm — Panitch Schwarze Belisario & Nadel LLP (57) ABSTRACT

The present invention relates to an apparatus for automatically controlling illuminance, which transmits a dimming signal based on the zero-crossing of AC power using an illuminance control electronic switch. An apparatus for automatically controlling illuminance of Light-Emitting Diode (LED) lighting according to an embodiment of the present invention includes a dimming control electronic switch for, if manipulation of a switch by a user is sensed during supply of Alternating Current (AC) power to an LED lamp, interrupting supply of the AC power during a preset period of time based on zero-crossing of the AC power, and an LED lamp control device for controlling illuminance of the LED lamp by detecting supply and interruption of the AC power.

10 Claims, 5 Drawing Sheets

(56) References Cited

U.S. PATENT DOCUMENTS

| | | | |
|---|---|---|---|
| 8,294,379 B2 * | 10/2012 | Liu et al. | 315/224 |
| 2007/0096561 A1 * | 5/2007 | Takeda et al. | 307/9.1 |
| 2010/0013409 A1 * | 1/2010 | Quek et al. | 315/294 |

FOREIGN PATENT DOCUMENTS

| KR | 10-2009-0097686 A | 9/2009 |
|---|---|---|
| KR | 10-2010-0062377 A | 6/2010 |
| KR | 10-0970581 B1 | 7/2010 |
| KR | 10-0970613 B1 | 7/2010 |
| KR | 10-1124478 B1 | 2/2012 |
| WO | 2005051051 A2 | 6/2005 |

OTHER PUBLICATIONS

Int'l Search Report issued Feb. 17, 2012 in Int'l Application No. PCT/KR2011/004623.

* cited by examiner

APPARATUS FOR AUTOMATICALLY CONTROLLING THE ILLUMINATION OF LED LIGHTING

CROSS-REFERENCE TO RELATED APPLICATIONS

This application is a Section 371 of International Application No. PCT/KR2011/004623, filed Jun. 24, 2011, which was published in the Japanese language on Dec. 29, 2011, under International Publication No. WO 2011/162569 A2 and the disclosure of which is incorporated herein by reference.

BACKGROUND OF THE INVENTION

The present invention relates, in general, to an apparatus for automatically controlling illuminance and, more particularly, to an apparatus for automatically controlling illuminance, which is used for Light-Emitting Diode (LED) lighting.

In the past, incandescent lamps and fluorescent lamps have been mainly used as lighting devices. However, incandescent lamps and fluorescent lamps have relatively high power consumption compared to lighting efficiency, and consume 2 trillion 100 billion kWh of power annually by internal lighting equipment. This corresponds to 12 to 15% of gross power consumption, and also results in 1.7 billion tons of $CO_2$ being emitted each year. Further, since such a fluorescent lamp is manufactured using mercury and the lifespan thereof is short, the fluorescent lamp must be frequently replaced, so unless it is properly taken away and discarded, the problem of environmental pollution may also seriously emerge. Due to these problems, recently, environmental restriction has been intensified all over the world in such a way as to pass a bill that would result in the prohibition of the sale of incandescent lamps and fluorescent lamps in some countries.

Therefore, lighting using a Light-Emitting Diode (LED) that has excellent energy saving effects and environment-friendly characteristics has recently attracted attention. Such LED lighting has a long lifespan, high luminance, and low power consumption, thus obtaining the effect of energy saving. The excellence of LED lighting is widely known in such a way as to predict that, if 30% of current domestic lighting were to be replaced with LED lighting by 2015, it would result in the saving of about 16 billion kWh of power and the reduction of about 6.8 million tons of $CO_2$ emissions per year. Further, an LED lamp is regarded as a means for replacing a downlight or the like, which has been implemented as an incandescent lamp or a halogen lamp among typical lighting units.

Figure 1:
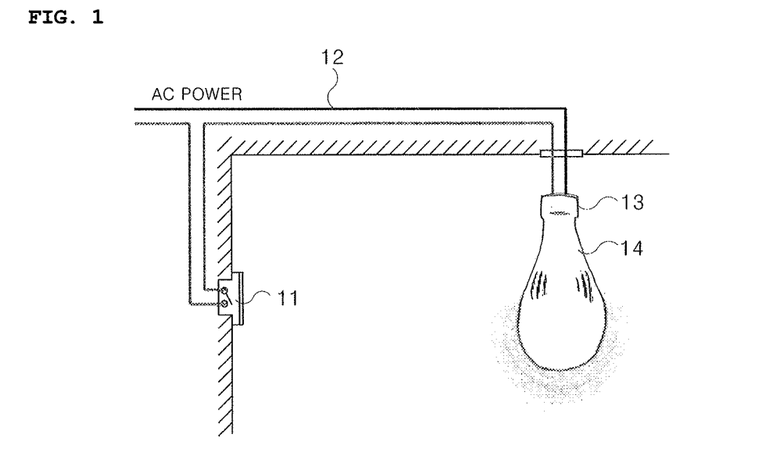
FIG. 1 is a diagram showing a conventional LED lighting system.

As shown in FIG. 1, current LED lighting is configured such that only a lamp is replaced with an LED lamp 14 while a lighting switch 11, lighting wiring 12, and a socket 13 used in existing incandescent lamps or fluorescent lamps are used without change. Such LED lighting can control only the ON/OFF operation of the LED lamp 14 using the lighting switch 11 that has been previously used and cannot control the illuminance thereof.

Figure 2:
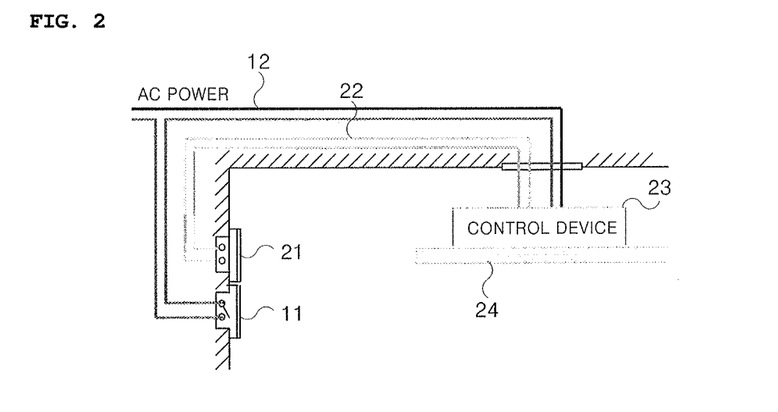
FIG. 2 is a diagram showing a conventional LED lighting system enabling illuminance to be controlled.

Due thereto, as shown in FIG. 2, LED lighting enabling illuminance to be controlled is configured to further include an illuminance control switch 21, illuminance control wiring 22, a control device 23, and an LED lamp 24, separately from the existing lighting switch 11 and the existing lighting wiring 12.

That is, the LED lighting 24 is ON/OFF controlled using the lighting switch 11, and the illuminance of the LED lamp 24 is controlled using the illuminance control switch 21. Then, the control device 23 is subjected to the ON/OFF control of the lighting switch 11 and the illuminance control of the illuminance control switch 21, and then drives the LED lamp 24.

Such conventional LED lighting enabling illuminance to be controlled is problematic in that additional wiring construction must be conducted separately from the existing lighting wiring 12, and in that construction for installing additional switches must be conducted, thus complicating the overall installation and increasing the cost thereof.

BRIEF SUMMARY OF THE INVENTION

Accordingly, the present invention has been made keeping in mind the above problems, and an object of the present invention is to provide an apparatus for automatically controlling the illuminance of LED lighting, which can control the ON/OFF operation and illuminance of an LED lamp without installing a separate illuminance control switch and illuminance control wiring, and which allows a user to easily control the illuminance of the LED lamp using an electronic switch for dimming control.

In order to accomplish the above object, an apparatus for automatically controlling illuminance of Light-Emitting Diode (LED) lighting according to an embodiment of the present invention includes a dimming control electronic switch for, if manipulation of a switch by a user is sensed during supply of Alternating Current (AC) power to an LED lamp, interrupting supply of the AC power during a preset period of time based on zero-crossing of the AC power, and an LED lamp control device for controlling illuminance of the LED lamp by detecting supply and interruption of the AC power.

The above-described present invention can control the ON/OFF operation and illuminance of an LED lamp by replacing a control device and an LED lamp in an existing typical lighting system, thus lengthening the lifespan of a lighting lamp, obtaining the effect of additional electricity saving based on the control of illuminance, and realizing emotional lighting based on the control of illuminance.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The present invention can be changed in various manners and can have various embodiments, so that specific embodiments will be illustrated in the drawings and will be described in detail in the present specification.

However, this is not intended to limit the present invention to specific embodiments and it should be understood that all changes, equivalents or substitutions within the spirit and scope of the present invention are included in the present invention.

The terms including ordinal numbers, such as "first" and "second," may be used to describe various components, but those components should not be limited by the terms.

The terms are merely used to distinguish one component from other components. For example, a first component may be designated as a second component and a second component may be designated as a first component in the similar manner, without departing from the scope of the present invention.

It should be understood that a representation indicating that a first component is "connected" or "coupled" to a second component may include the case where the first component is connected or coupled to the second component with a third component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components.

The terms used in the present specification are merely used to describe specific embodiments and are not intended to limit the present invention. A singular expression includes a plural expression unless a description to the contrary is specifically pointed out in context.

In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Further, drawings attached to the present specification should be understood to be magnified or reduced for the sake of convenience of the description.

Hereinafter, an apparatus for automatically controlling the illuminance of LED lighting according to an embodiment of the present invention will be described in detail with reference to the attached drawings.

The applicant of the present invention filed an LED lighting system capable of controlling the ON/OFF operation and illuminance of an LED lamp in the Korean Intellectual Property office as Korean Patent Application No. 2009-0110113.

Figure 3:
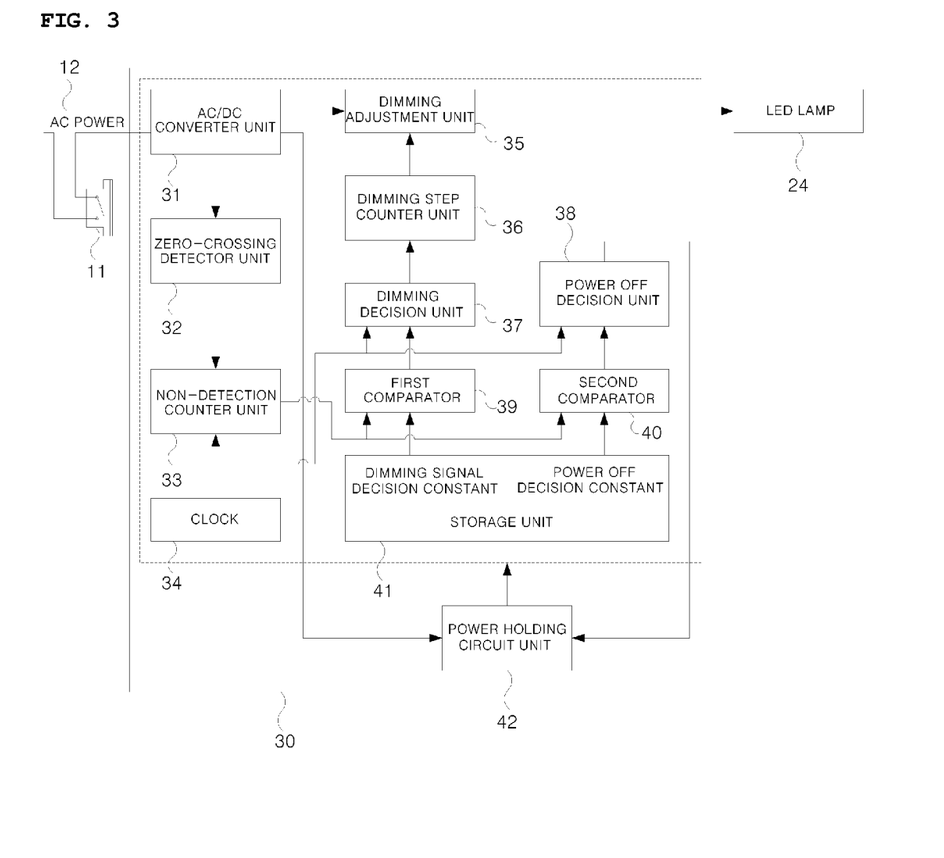
FIG. 3 is a diagram showing a lighting system including an LED lamp control device, disclosed in Korean Patent Application No. 2009-0110113.

FIG. 3 is a functional block diagram showing an LED lighting system enabling illuminance to be controlled, which is disclosed in Korean Patent Application No. 2009-0110113. The LED lighting system enabling illuminance to be controlled, disclosed in the above prior patent, includes a lighting switch 11, lighting wiring 12, an LED lamp control device 30, and an LED lamp 24.

The LED lamp control device 30 includes an Alternating Current (AC)/Direct Current (DC) converter unit 31, an ON/OFF detection means for detecting the ON and OFF states of the lighting switch, a dimming determination means for receiving information about the ON/OFF state of the lighting switch from the ON/OFF detection means, determining the snapping operation of the lighting switch, and then outputting a dimming signal, a dimming adjustment means for, if the dimming signal is input from the dimming determination means, adjusting the illuminance of the LED lamp, a power holding circuit unit 42 for supplying driving power to the LED lamp when the snapping operation of the lighting switch is performed, and a power OFF means for receiving information about the OFF state of the lighting switch from the ON/OFF detection means, and turning off the LED lamp if the OFF state of the lighting switch exceeds a threshold time.

The lighting switch 11 is connected in series to AC power through the lighting wiring 12, and configured to supply or interrupt the AC power to the LED lamp 24. When a user temporarily turns off the lighting switch 11 in an ON state and then turns on it again, that is, when the lighting switch 11 temporarily enters an OFF state from an ON state and then enters the ON state again (this operation is referred to as 'snapping'), the LED lamp control device 30 recognizes this signal as a dimming control signal.

The ON/OFF detection means includes a zero-crossing detector unit 32, a non-detection counter unit 33, and a clock 34. The dimming determination means includes a storage unit 41, a first comparator 39, and a dimming decision unit 37. The power OFF means includes the storage unit 41, a second comparator 40, and a power OFF decision unit 38. The dimming adjustment means includes a dimming step counter unit 36 and a dimming adjustment unit 35. For description of the detailed configuration and operation of the LED lamp control device 30, the specification of Korean Patent Application No. 2009-0110113, is referred to.

The LED lighting system enabling illuminance to be controlled, disclosed in the above Korean Patent Application No. 2009-0110113, turns on the LED lamp 24 at the maximum brightness when the user turns on the lighting switch 11. In the state in which the LED lamp 24 is turned on (ON state) in this way, if the lighting switch 11 is turned off (OFF state) for a temporary period (a dimming threshold time) and is then turned on (ON state), the illuminance of the LED lamp is adjusted to be decreased step by step. If the user stops the operation at his or her desired brightness, the state of brightness is maintained. If a predetermined period of time has elapsed after the user turned off the lighting switch, all operations are reset and then the LED lamp is turned off.

Figure 4:
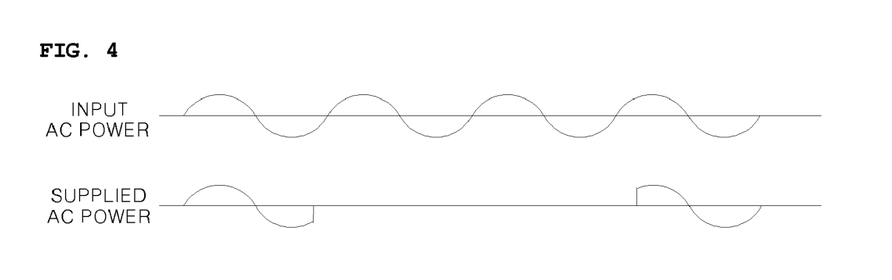
FIG. 4 is a diagram showing the problem of an apparatus for automatically controlling the illuminance of LED lighting, disclosed in Korean Patent application No. 2009-0110113.

The above Korean Patent Application No. 2009-0110113, is configured such that the user arbitrarily turns off the lighting switch and then turns on it and such that, as shown in FIG. 4, while the user turns off the lighting switch, AC power supplied to the LED lamp control device 30 is interrupted and cut off.

In this way, in the technology disclosed in Korean Patent Application No. 2009-0110113, the user manually turns off/on the lighting switch, and the LED lamp control device controls the illuminance of the LED lamp using clock counting performed while zero-crossing is not detected, so that a time during which the AC power is interrupted is long, as shown in FIG. 4. However, since the LED lamp must be turned on even when the user performs a snapping operation, driving power must be supplied both to the LED lamp control device 30 and to the LED lamp 24 even while the AC power is interrupted.

For this operation, the power holding circuit unit 42 charges the input power, and supplies charged power both to the LED lamp control device 30 and to the LED lamp 24 upon performing the snapping operation. However, Korean Patent Application No. 2009-0110113 is problematic in that the user manually snaps the lighting switch and then an AC power OFF time is long, so that the capacity of the internal condenser of the power holding circuit unit 42 must be large.

In order to solve the above problem of Korean Patent Application No. 2009-0110113, the present invention proposes technology in which an illuminance control electronic switch snaps for a minimum period of time based on the zero-crossing of AC power and interrupts power to be supplied to the LED lamp control device, thus reducing the capacity of the internal condenser of the power holding circuit unit 42.

Figure 5:
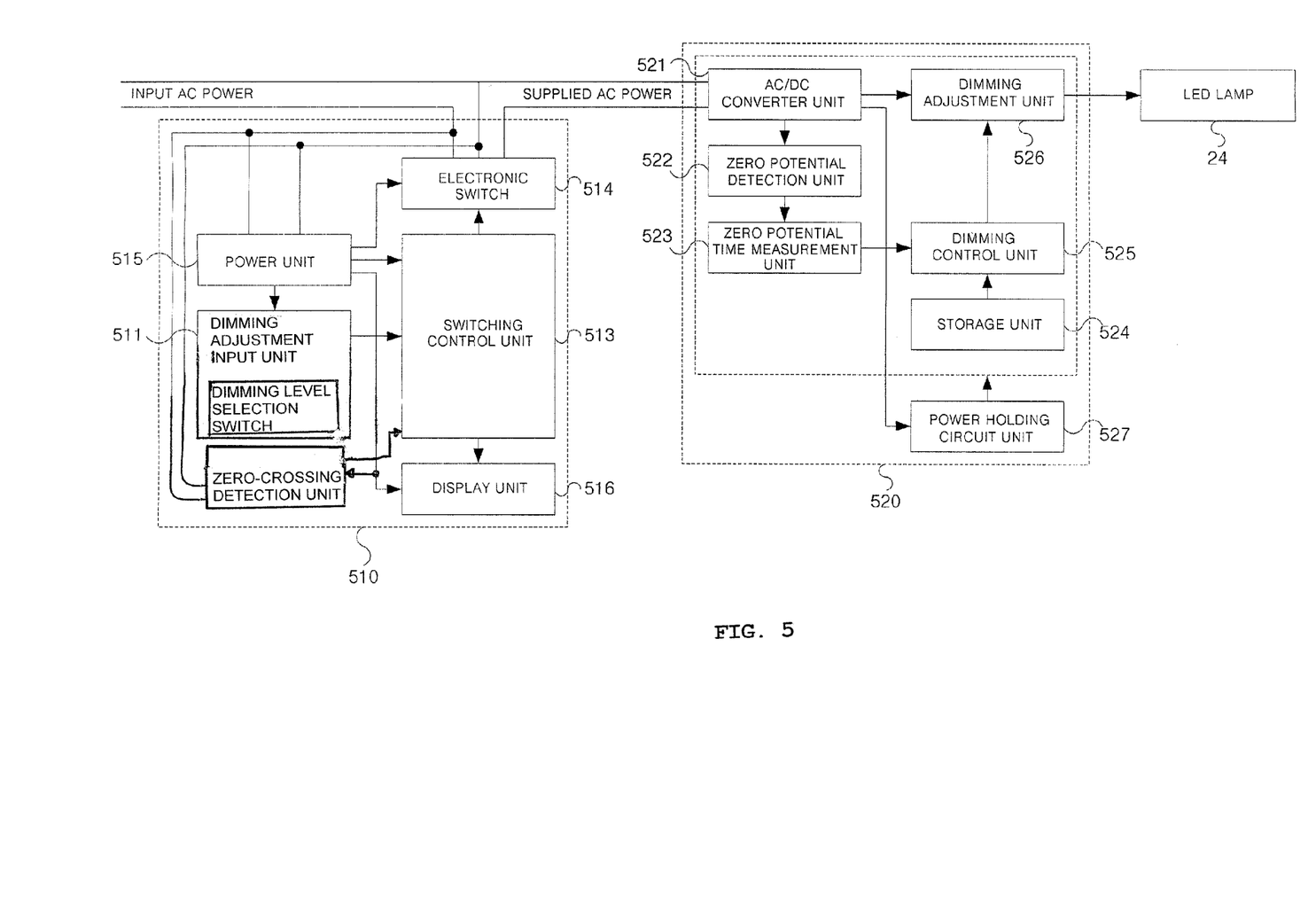
FIG. 5 is a system configuration diagram showing an apparatus for automatically controlling the illuminance of LED lighting according to the present invention.
Figure 6:
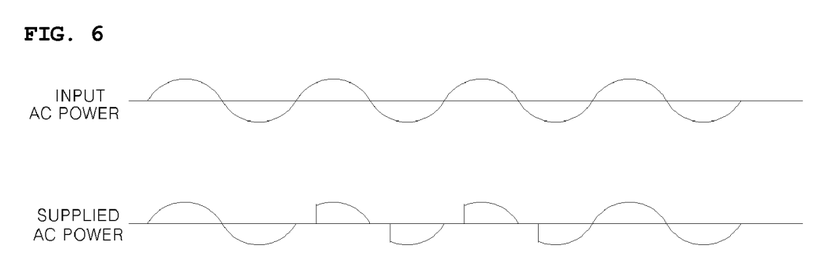
FIG. 6 is a waveform diagram showing the signals of the apparatus for automatically controlling the illuminance of LED lighting according to the present invention.

FIG. 5 is a block diagram showing the configuration of an apparatus for automatically controlling the illuminance of LED lighting according to an embodiment of the present invention.

The apparatus for automatically controlling the illuminance of LED lighting according to the present invention is generally divided into a dimming control electronic switch 510 for generating a dimming control signal by switching AC power depending on the manipulation of a user, and an LED lamp control device 520 for analyzing the dimming control signal from the switching of the AC power, thus adjusting and controlling the illuminance of an LED lamp 24.

The dimming control electronic switch 510 includes a dimming adjustment input unit 511 manipulated by the user, a zero-crossing detection unit 512 for detecting zero-crossing at which the phase of input AC power changes, a switching control unit 513 for outputting a power supply signal or outputting a power interruption signal during a preset period of time based on the zero-crossing detected by the zero-crossing detection unit 512, depending on the state of the manipulation of the dimming adjustment input unit 511 by the user, an electronic switch 514 for switching between the input AC power and the LED lamp control device 520 in response to the power supply signal and the power interruption signal output from the switching control unit 513, and a power unit 515 for generating driving power from the input AC power and supplying the driving power to the internal components of the dimming control electronic switch 510. The switching control unit 513 displays the current ON/OFF state, current dimming level, etc. of the LED lamp on a display unit 516.

The dimming control electronic switch 510 may be implemented as a 3-wire switch or a 2-wire clockcon switch. The dimming adjustment input unit 511 includes an ON/OFF switch for controlling the ON/OFF operation of the LED lamp 24, and a dimming level selection switch. The user adjusts the illuminance of the LED lamp by manipulating the dimming level selection switch, and turns on/off the LED lamp by manipulating the ON/OFF switch.

Here, the preset period of time during which the power interruption signal is output is set as a time shorter than the half period of the AC power.

The LED lamp control device 520 includes an AC/DC converter unit 521 for receiving supplied or interrupted AC power and converting the AC power into DC power, a zero potential detection unit 522 for detecting zero potential from the supplied or interrupted AC power, a zero potential time measurement unit 523 for measuring the duration of the zero potential detected by the zero potential detection unit 522, a storage unit 524 for storing a dimming decision time and a power OFF decision time, a dimming control unit 525 for individually comparing the duration of the zero potential with the dimming decision time and the power OFF decision time, and then outputting an LED lamp control signal, a dimming adjustment unit 526 for adjusting the illuminance of the LED lamp 24 in response to the LED lamp control signal, and a power holding circuit unit 527 for supplying driving power to the individual components of the LED lamp control device 520 and to the LED lamp 24 while the dimming control electronic switch 510 interrupts the supply of the AC power. The power OFF decision time is set as a time longer than the dimming decision time.

The zero potential detection unit 522 detects a point at which the supplied or interrupted AC power becomes zero potential. That is, the zero potential detection unit 522 intermittently detects zero potential while the AC power is normally supplied, and continuously detects zero potential while the supply of the AC power is interrupted. The zero potential time measurement unit 523 measures the duration of the zero potential detected by the zero potential detection unit 522.

The electronic switch 514 may be implemented as a relay or a triac. The dimming adjustment input unit 511 may be implemented as a remote control reception unit (not shown) so that the dimming degree of the LED lamp can be adjusted using the remote control, or may further include a remote control reception unit (not shown) in addition to the dimming adjustment input unit 511 so that the dimming degree of the LED lamp can be adjusted using the remote control.

The method of operating the apparatus for automatically controlling the illuminance of the LED lighting device according to the present invention will be described below.

When the user manipulates the ON/OFF switch of the dimming adjustment input unit 511 of the dimming control electronic switch 510 to turn on the switch, the switching control unit 513 recognizes the ON state and outputs a power supply signal to the electronic switch 514, thus enabling the input AC power to be supplied to the LED lamp control device 520.

The zero potential detection unit 522 detects zero potential from the AC power supplied to the LED lamp control device 520. Since only zero-crossing at which the phase of the AC power changes corresponds to the zero potential while the AC power is normally supplied to the LED lamp control device 520, the duration of the zero potential detected by the zero potential detection unit 522 is very short. The zero potential time measurement unit 523 measures the duration of the zero potential and provides the measured duration to the dimming control unit 525. The dimming control unit 525 individually compares the duration of the zero potential with the dimming decision time and the power OFF decision time. In this case, if the duration of the zero potential is shorter than the dimming decision time, the dimming control unit 525 controls the dimming adjustment unit 526 so that the current illuminance of the LED lamp 24 is maintained.

Meanwhile, when the user adjusts the illuminance of the LED lamp by manipulating the dimming level selection switch of the dimming adjustment input unit 511 of the dimming control electronic switch 510, the switching control unit 513 receives information about zero-crossing at which the phase of the input AC power changes from the zero-crossing detection unit 512, and outputs a power interruption signal to the electronic switch 514 during a preset period of time based on the zero-crossing of the input AC power. Here, the preset period of time is set in advance as an arbitrary time that is shorter than ¼ of the period of the input AC power.

The electronic switch 514 supplies the input AC power to the LED lamp control device 520 while the power supply signal is input from the switching control unit 513, but interrupts the input AC power so that the input AC power is not supplied to the LED lamp control device 520 while the power interruption signal is input from the switching control unit 513. The interruption of the supply of the AC power to the LED lamp control device 520 means that the supplied AC power is at zero potential, so that the zero potential detection unit 522 detects such zero potential.

The switching control unit 513 sequentially outputs the power supply signal and the power interruption signal in a specific pattern, so that the AC power that is supplied to the LED lamp control device 520 is switched by the electronic switch 514, thus transmitting a dimming control signal to the LED lamp control device 520.

The zero potential detection unit 522 detects zero potential while the AC power is interrupted, and the zero potential time measurement unit 523 measures the duration of the zero potential and provides the measured duration to the dimming control unit 525. The dimming control unit 525 individually compares the duration of the zero potential with a dimming decision time and a power OFF decision time, and adjusts the illuminance of the LED lamp 24 by controlling the dimming adjustment unit 526 if the duration of the zero potential is longer than the dimming decision time and is shorter than the power OFF decision time. The dimming adjustment unit 526 adjusts the illuminance of the LED lamp 24 by adjusting the DC power, which is supplied to the LED lamp 24, in the DC power output from the AC/DC converter unit 521. Meanwhile, while the supply of the AC power is interrupted, the power holding circuit unit 527 supplies driving power to the individual components of the LED lamp control device 520 and to the LED lamp 24, thus enabling the LED lamp 24 to maintain its preset illuminance.

When the user manipulates the ON/OFF switch of the dimming adjustment input unit 511 of the dimming control electronic switch 510 to turn off the switch, the switching control unit 513 recognizes the OFF state and outputs a power interruption signal to the electronic switch 514, thus interrupting the supply of AC power to the LED lamp control device 520.

Then, the AC power is continuously maintained at the zero potential, and the zero potential detection unit 522 detects the zero potential. The zero potential time measurement unit 523 measures the duration of the zero potential, and provides the measured duration to the dimming control unit 525. If the duration of the zero potential is longer than the power OFF decision time, the dimming control unit 525 interrupts the driving power that has been supplied to the LED lamp 24 by adjusting the dimming adjustment unit 526, thus causing the LED lamp 24 to be turned off.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for automatically controlling illuminance, comprising:
    a dimming control electronic switch for, if manipulation of a switch by a user is sensed during supply of Alternating Current (AC) power to a Light-Emitting Diode (LED) lamp, interrupting supply of the AC power during a preset period of time based on zero-crossing of the AC power; and
    an LED lamp control device for measuring duration of zero potential by detecting supply and interruption of the AC power, individually comparing duration of zero potential with a dimming decision time and a power OFF decision time, and if the duration of the zero potential is shorter than the dimming decision time, maintaining the current illuminance of the LED lamp, and if the duration of the zero potential is longer than the dimming decision time and is shorter than the power off decision time, controlling illuminance of the LED lamp, and if the duration of the zero potential is longer than the power off decision time, turning off the LED lamp.

2. The apparatus of claim 1, wherein the dimming control electronic switch comprises:
    a dimming adjustment input unit including a dimming level selection switch manipulated by the user;
    a zero-crossing detection unit for detecting zero-crossing of the AC power;
    a switching control unit for outputting a power supply signal, or outputting a power interruption signal during the preset period of time based on the zero-crossing detected by the zero-crossing detection unit, depending on a state of manipulation of the dimming adjustment input unit by the user; and
    an electronic switch for switching between the AC power and the LED lamp control device in response to the power supply signal and the power interruption signal output from the switching control unit.

3. The apparatus of claim 2, wherein the dimming control electronic switch further comprises a display unit for displaying the ON/OFF state and a dimming level of the LED lamp under control of the switching control unit.

4. The apparatus of claim 2, wherein the electronic switch is a relay or a triac.

5. The apparatus of claim 2, wherein the dimming control electronic switch further comprises a remote control reception unit for receiving a remote control signal for dimming adjustment.

6. The apparatus of claim 2, wherein the dimming adjustment input unit is a remote control reception unit.

7. The apparatus of claim 1, wherein the dimming control electronic switch is implemented as a 3-wire switch or a 2-wire clockcon switch.

8. The apparatus of claim 1, wherein the LED lamp control device comprises:
    an AC/Direct Current (DC) converter unit for converting the AC power input through the dimming control electronic switch into DC power;
    a zero potential detection unit for detecting zero potential from the AC power;
    a zero potential time measurement unit for measuring duration of the zero potential detected by the zero potential detection unit;
    a storage unit for storing the dimming decision time and the power OFF decision time;
    a dimming control unit for individually comparing the duration of the zero potential with the dimming decision time and the power OFF decision time, and then outputting an LED lamp control signal; and
    a dimming adjustment unit for adjusting magnitude of DC power output from the AC/DC converter unit and supplied to the LED lamp in response to the LED lamp control signal, thus adjusting the illuminance of the LED lamp.

9. The apparatus of claim 8, wherein the LED lamp control device further comprises a power holding circuit unit for charging the DC power while the dimming control electronic switch supplies the AC power, and supplying driving power to individual components of the LED lamp control device while the dimming control electronic switch interrupts the AC power.

10. The apparatus of claim 1, wherein the preset period of time is a time shorter than ¼ of a period of the AC power.

* * * * *